United States Patent [19]

Reznikov et al.

[11] Patent Number: 5,724,831
[45] Date of Patent: Mar. 10, 1998

[54] METHOD OF AND APPARATUS FOR COOLING FOOD PRODUCTS

[76] Inventors: Lev Reznikov, 1510 Ocean Pkwy, #A17, Brooklyn, N.Y. 11230; Zachary Schulman, 30 Spring Meadow Rd., Mount Kisco, N.Y. 10536

[21] Appl. No.: 562,577

[22] Filed: Nov. 24, 1995

[51] Int. Cl.⁶ ............................................. F25J 5/00
[52] U.S. Cl. ...................... 62/603; 62/384; 62/601; 239/550
[58] Field of Search ........................... 62/384, 601, 602, 62/603

[56] References Cited

U.S. PATENT DOCUMENTS 4,640,460  2/1987  Franklin, Jr. ............................ 239/2.2

Primary Examiner—Henry A. Bennett
Assistant Examiner—Pamela A. O'Connor
Attorney, Agent, or Firm—I. Zborovsky

[57] ABSTRACT

For cooling food products in a container, a distributor pipe for supplying liquid carbon dioxide extends into an interior of the container and a plurality of nozzles are arranged on the distributor pipe so that liquid carbon dioxide is discharged from the nozzles in jets extending substantially parallel to a longitudinal axis of the distributor pipe and against one another to collide at the midpoint between two neighboring nozzles.

5 Claims, 2 Drawing Sheets

5,724,831

1

METHOD OF AND APPARATUS FOR COOLING FOOD PRODUCTS

BACKGROUND OF THE INVENTION

The present invention relates to a method of and an apparatus for cooling food products for example in rail cars, containers, vessels, trucks, etc.

It is well known to cool food products with carbon dioxide. In known methods and apparatuses liquid carbon dioxide is supplied into the interior of a container and discharged through a plurality of nozzles so that the liquid carbon dioxide is chilled and forms snow which covers food products accommodated in the container.

It is known to provide a discharge of liquid carbon dioxide in the interior of the container by nozzles which are located at opposite sides of a central pipe and discharge carbon dioxide toward one another and to the same point in the central pipe. This solution is disclosed for example in U.S. Pat. No. 4,640,460. It however possesses some disadvantages. The apparatus has a high material consumption because it includes at least three pipes with a central pipe and two side pipes. As for the central pipe, it actually does not operate as a heat exchange element since it has a small surface. During operation of the apparatus it directs too much snow toward side walls of the container. First of all in the area near the side walls there is no need for cold, and furthermore cold is lost due to heat transfer through the walls.

SUMMARY OF THE INVENTION

Accordingly, it is an object of the present invention to provide a method of and an apparatus for cooling food products, which is a further improvement of the existing methods and apparatuses.

In keeping with these objects and with others which will become apparent hereinafter, one feature of the present invention resides, briefly stated, in a method of cooling food products, which has the steps of supplying liquid carbon dioxide through a distributor pipe, discharging the liquid carbon dioxide from the distributor pipe through a plurality of nozzles, and arranging the nozzles on the distributor pipe so that jets of liquid carbon dioxide ejecting by the nozzles extend substantially along the distributor pipe and against one another to collide substantially between two neighboring ones of the nozzles.

It is also an object of the present invention to provide an apparatus for cooling food products, which comprises a tubular pipe adapted to extend in an interior of the container so as to supply liquid carbon dioxide, and a plurality of nozzles arranged on the distributor pipe to discharge the liquid carbon dioxide from the distributor pipe, the nozzles being arranged so that jets of liquid carbon dioxide ejected by the nozzles extend substantially along a longitudinal of the distributor pipe and against one another to collide substantially between the nozzles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

2

Figure 1:
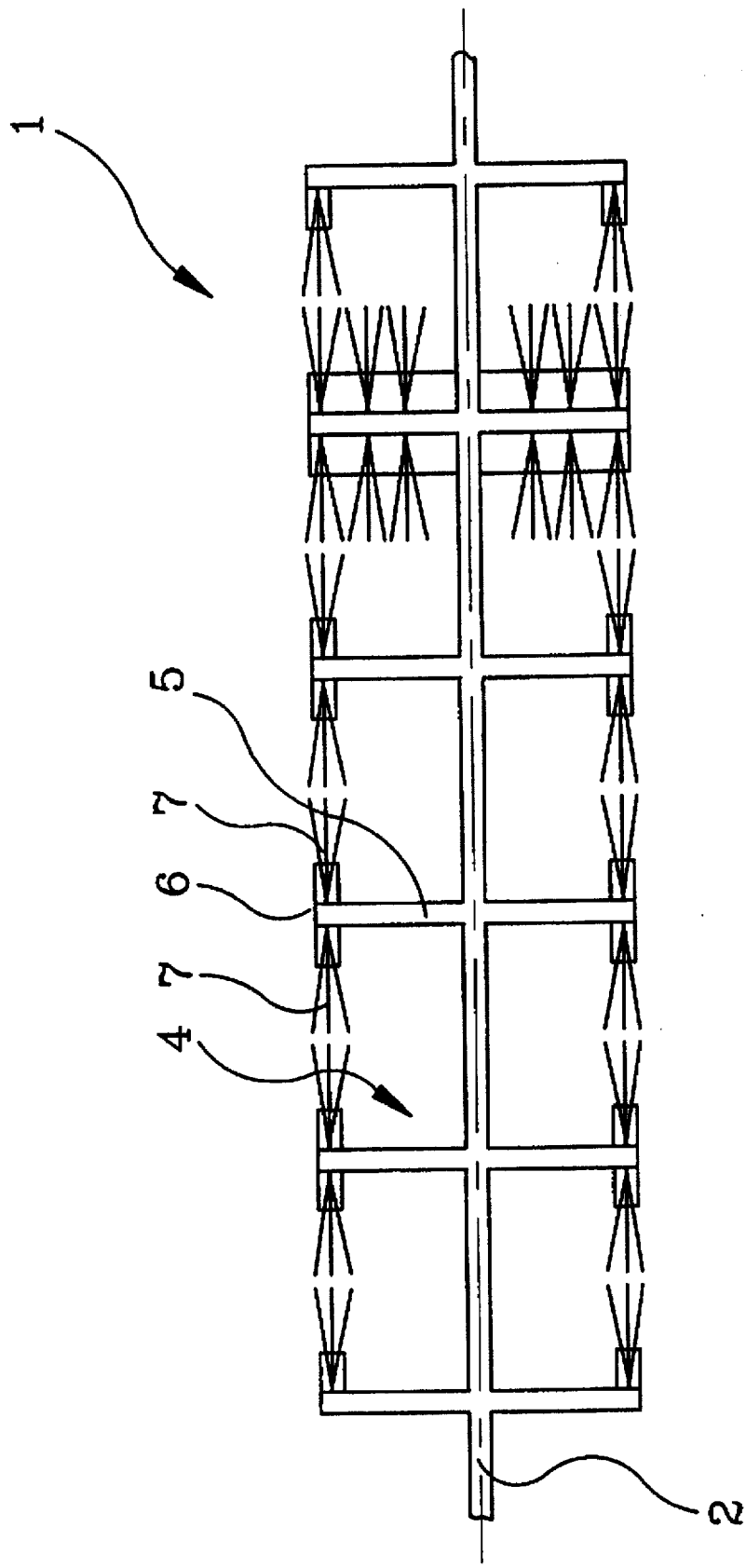
FIG. 1 is a top view of the apparatus for cooling food products.
Figure 2:
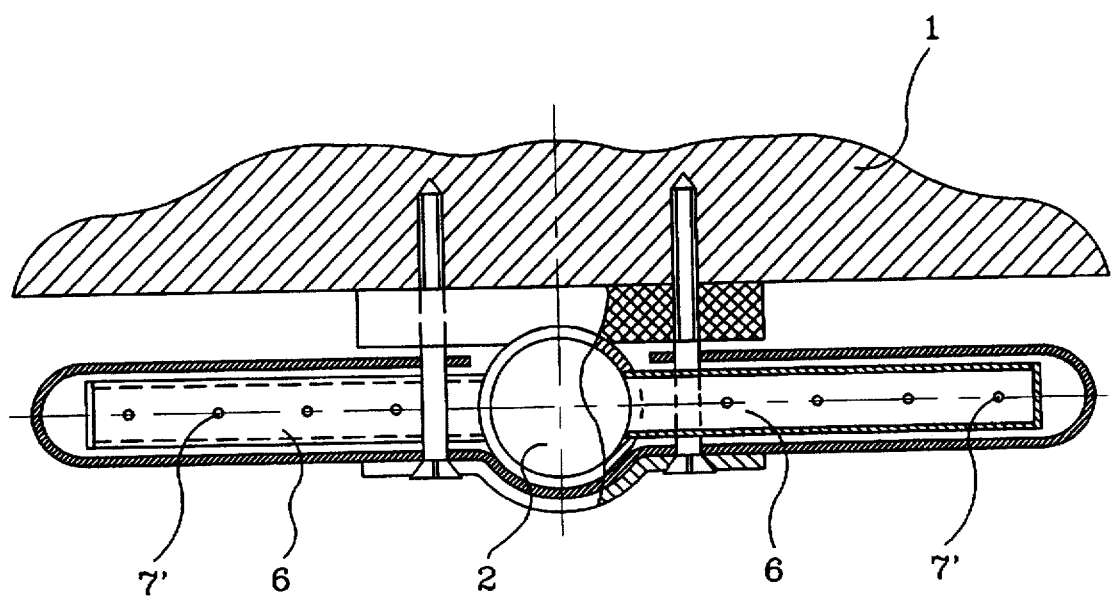

FIG. 2 is a view of the nozzle feature including a tubular outlet portion with the outlet ends.

DESCRIPTION OF THE PREFERRED EMBODIMENTS

An apparatus in accordance with the present invention is used for cooling food products stored in a container which is identified as a whole with reference numeral 1. The apparatus includes a supply pipe 2 having one end connected with a not shown tank which accommodates liquid carbon dioxide. The supply pipe 2 extends into the interior of the container 1 and is connected with a distributor pipe 3. A plurality of nozzles 4 are mounted on the distributor pipe 3 at opposite sides of a longitudinal axis of the distributor pipe.

Each nozzle 4 has a first inlet tubular portion 5 which communicates with the interior of the distributor pipe 3. Each nozzle further has a second tubular outlet portion 6 which communicates with the interior of the first tubular portion 5 by openings 7 and is provided with two open ends 8. As can be seen from the drawings, one group of the nozzles 4 is located at one longitudinal side of the distributor pipe 3, while the other group of the nozzles 4 is located on the other side of the longitudinal axis of the distributor pipe 3. The inlet portions 5 of the nozzle 4 extend substantially perpendicular to the distributor pipe 3, while the outlet portion 6 of the nozzle 4 extends substantially parallel to the distributor pipe 3.

As can be seen from the drawings, the outlet ends 7 of two neighboring nozzles 4 are arranged so that they face one another. Therefore the jets of liquid carbon dioxide ejected from two neighboring nozzles 4 are directed substantially parallel to the distributor pipe 3 and toward one another so as to collide substantially between the two neighboring nozzles 4. Thereby carbon dioxide snow is produced and distributed over a food product stored in the container 1.

When the apparatus is designed in accordance with the present invention with the nozzles arranged as shown in the drawings, it provides for highly advantageous results. The apparatus is less material consuming since the number of pipes is reduced. It concentrates cold in the areas where it is actually needed for cooling the food products.

In accordance with further embodiments it is possible to provide in each end of the portion 5 of the nozzles several discharge openings 7' as shown in FIG. 2. The outlet portions of the nozzles must not extend parallel to the distributor pipe, but can be inclined at certain angles relative to it.

It will be understood that each of the elements described above, or two or more together, may also find a useful application in other types of methods and constructions differing from the types described above.

While the invention has been illustrated and described as embodied in a method of and apparatus for cooling food products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of cooling food products in a container, comprising the steps of supplying liquid carbon dioxide through a distributor pipe; discharging the liquid carbon dioxide from the distributor pipe through a plurality of nozzles; and arranging the nozzles on the distributor pipe so that jets of liquid carbon dioxide ejecting by the nozzles extend substantially along a longitudinal axis of the distributor pipe and toward one another to collide substantially between two neighboring ones of the nozzles.

2. A method as defined in claim 1, wherein said step of arranging includes arranging the nozzles so that one group of the nozzles is located at one side of a longitudinal axis of the distributor pipe, while another group of the nozzles is arranged at the other side of the longitudinal axis of the distributor pipe.

3. An apparatus for cooling food products in a container, comprising a tubular pipe adapted to extend in an interior of the container so as to supply liquid carbon dioxide; and a plurality of nozzles arranged on said distributor pipe to discharge the liquid carbon dioxide from the distributor pipe, said nozzles being arranged so that jets of liquid carbon dioxide ejected by said nozzles extend substantially along a longitudinal axis of said distributor pipe and toward one another to collide substantially between said nozzles.

4. An apparatus for cooling food products in a container, comprising a tubular pipe adapted to extend in an interior of the container so as to supply liquid carbon dioxide; and a plurality of nozzles arranged on said distributor pipe to discharge the liquid carbon dioxide from the distributor pipe, said nozzles being arranged so that jets of liquid carbon dioxide ejected by said nozzles extend substantially along a longitudinal axis of said distributor pipe and toward one another to collide substantially between said nozzles, each of said nozzles having a first inlet portion arranged substantially perpendicular to said distributor pipe and communicating with an interior of said distributor pipe, and second outlet portion communicating with an interior of said first portion and extending substantially parallel to said distributor pipe, said outlet portion having two open ends spaced from one another in a longitudinal direction of said longitudinal pipes.

5. An arrangement as defined in claim 4, wherein said nozzles include one group of nozzles located on one side of a longitudinal axis of said distributor pipe and another group of nozzles arranged at another side of said longitudinal axis of said distributor pipe.

\* \* \* \* \*